United States Patent [19]

Dorner et al.

[11] 4,429,663
[45] Feb. 7, 1984

[54] REACTOR PRESSURE VESSEL FOR A BOILING-WATER REACTOR

[75] Inventors: Heinrich Dorner; Günter Rabe, both of Erlangen, Fed. Rep. of Germany

[73] Assignee: Kraftwerk Union Aktiengesellschaft, Mulheim an der Ruhr, Fed. Rep. of Germany

[21] Appl. No.: 264,139

[22] Filed: May 15, 1981

Related U.S. Application Data

[63] Continuation of Ser. No. 52,629, Jun. 27, 1979, abandoned.

[30] Foreign Application Priority Data

Jul. 5, 1978 [DE] Fed. Rep. of Germany ....... 2829590

[51] Int. Cl.³ ............................................. F22B 37/22
[52] U.S. Cl. .................................... 122/365; 122/32; 122/360; 285/189
[58] Field of Search ............... 122/511, 360, 362, 365, 122/412, 451 R, 196, 1 C, DIG. 13; 285/150, 158, 189

[56] References Cited

U.S. PATENT DOCUMENTS

| | | | |
|---|---|---|---|
| 1,603,968 | 10/1926 | Metten | 285/189 |
| 1,610,741 | 12/1926 | Broido | 285/189 |
| 2,203,357 | 6/1940 | Kerr | 122/365 |
| 2,252,069 | 8/1941 | Fletcher | 122/365 |
| 3,362,383 | 1/1968 | Litwinoff | 122/360 |
| 3,792,729 | 2/1974 | Perry | 122/360 |
| 4,067,353 | 1/1978 | Detloff | 285/150 |
| 4,148,281 | 4/1979 | Stoll et al. | 122/32 |
| 4,168,071 | 9/1979 | Jacobson et al. | 122/365 |
| 4,272,964 | 6/1981 | Kunagai | 60/657 |

*Primary Examiner*—Henry C. Yuen
*Attorney, Agent, or Firm*—Herbert L. Lerner; Laurence A. Greenberg

[57] ABSTRACT

In a reactor pressure vessel for a boiling-water reactor having a feedwater inlet nozzle, the combination includes a heat protective pipe received in the nozzle and having an extension projecting therefrom, a feedwater sparger ring disposed in a given plane, and means for connecting the feedwater sparger ring to the heat protective pipe, the connecting means includes an elbow extending angularly from the given plane and connecting the feedwater sparger ring to the extension of the heat protective pipe.

8 Claims, 3 Drawing Figures

REACTOR PRESSURE VESSEL FOR A BOILING-WATER REACTOR

This is a continuation of application Ser. No. 052,629, filed June 27, 1979, now abandoned.

The invention relates to a reactor pressure vessel for a boiling-water reactor, comprising a feedwater inlet nozzle wherein a heat protective pipe is received, and a feedwater distribution or sparger ring which is connected to the heat protective pipe. By means of the heat protective pipe, cold feedwater is prevented from coming into contact directly with the reactor pressure vessel and, thereby, otherwise produce thermal stresses.

It is an object of the invention to improve accessibility of the feedwater inlet nozzle, so that so-called in-service inspections can be performed there. Such inspections serve to demonstrate at given intervals the perfect condition of the reactor pressure vessel, for example, by inspecting or testing with an ultrasonic measuring device.

With the foregoing and other objects in view, there is provided, in accordance with the invention, in a reactor pressure vessel for a boiling-water reactor having a feedwater inlet nozzle, the combination comprising a heat protective pipe received in the nozzle and having an extension projecting therefrom, a feedwater sparger ring disposed in a given plane, and means for connecting the feedwater sparger ring to the heat protective pipe, and the connecting means comprising an elbow extending angularly from the given plane and connecting the feedwater sparger ring to the extension of the heat protective pipe. The location of the connection is below the feedwater distribution or sparger ring. The connecting means can extend, at that location, in a horizontal plane parallel to the plane of the feedwater sparger ring. Thus, the feedwater sparger ring, after the connection is released or opened, can be lifted upwardly, so that the feedwater inlet nozzle with the heat protective pipe is then accessible for inspection. To establish the connection, in accordance with another feature of the invention, a hammerhead bolt with a vertical axis is used as a locking device is accessible from above the feedwater sparger ring. This affords, in a relatively simple manner, actuation or manipulation by remote control so that practically no personnel need be employed in the rather heavily radiating vicinity of the reactor pressure vessel. In reactor pressure vessels with several feedwater inlet nozzles for an optionally subdivided feedwater sparger ring which may then be subdivided, if desired or necessary, all of the connection devices or connecting means would be constructed in accordance with the invention.

In accordance with a further feature of the invention, two extensions project from the heat protective pipe, and the connecting means comprise two elbows extending angularly from the given plane of the feedwater sparger ring and connecting the feedwater sparger ring to the respective extensions of the heat protective pipe, the extensions and the elbows being, respectively, disposed symmetrically to one another with respect to a common plane of symmetry, and a locking device is disposed in the plane of symmetry and locks the extensions and the elbows together. With this symmetrical construction, a suitable symmetrical introduction or application of forces acting upon the connection device or connecting means is attained.

In accordance with an added feature of the invention, the locking acts through a spring. The spring then limits the holding force acting at the location of the connection device or connecting means. What is achieved thereby is that relative motion between the feedwater sparger ring and the heat protective tube is possible at the location of the connection device or connecting means, which affords equalization of varying thermal expansions. This is especially true if the engagement or abutment location between the elbow and the extension, in accordance with an additional feature of the invention, is precisely or finely machined, i.e. by grinding, for example.

For the latter purpose, a finely or precisely machined plate serving as an adapter is disposed, in accordance with yet another feature of the invention, between the extension and the elbow.

In accordance with yet a further feature of the invention, the plate is formed of an especially hard material or has an armor cladding.

In accordance with yet an added feature of the invention, the bolt of the locking device is a hammerhead bolt having a gripping surface thereon located above the feedwater sparger ring, the gripping surface being engageable by a tool for turning the bolt.

In accordance with a concomitant feature of the invention, the feedwater sparger ring has a part disposed opposite and in engagement with the armor-clad and finely machined side of the plate, the part of the feedwater sparger ring being substantially similarly armored-clad and finely machined.

Other features which are considered as characteristic for the invention are set forth in the appended claims.

Although the invention is illustrated and described herein as embodied in reactor pressure vessel for a boiling-water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
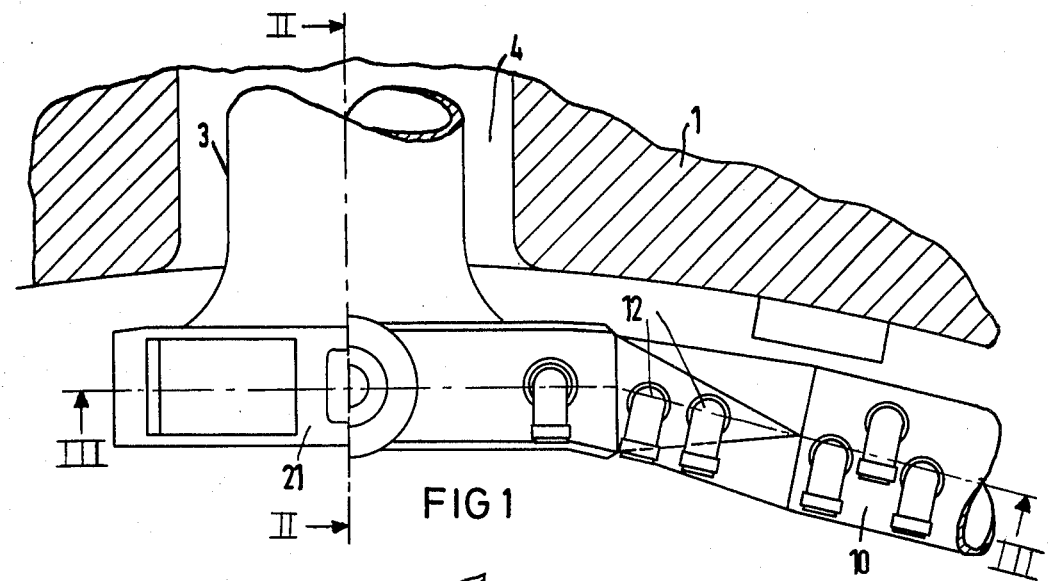
FIG. 1 is a fragmentary sectional view, taken along a horizontal plane, of a reactor pressure vessel in vicinity of a feedwater inlet nozzle thereof, and showing in top plan view, partly broken away, a feedwater distribution or sparger ring and a heat protective pipe associated with the feedwater inlet nozzle and connected to the sparger ring.
Figure 2:
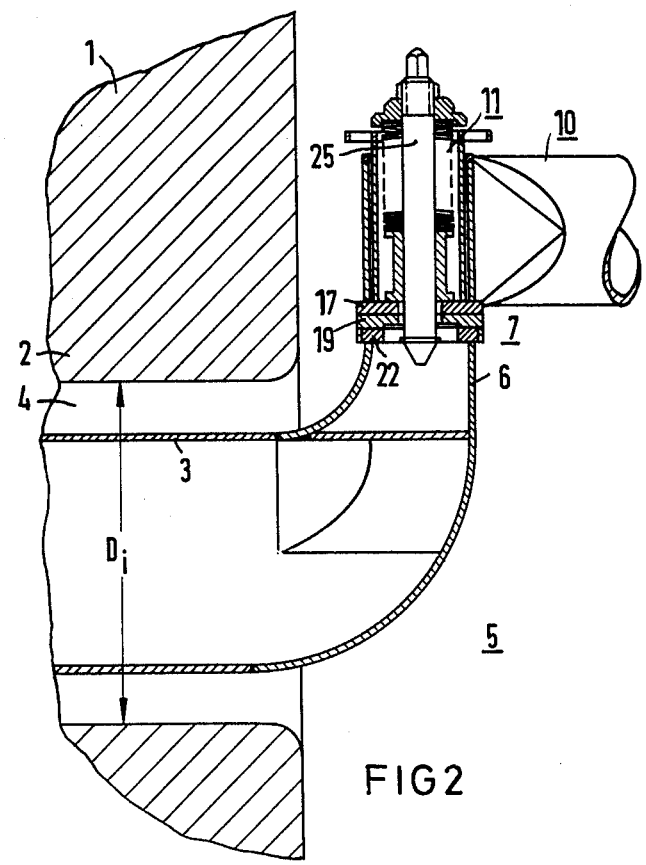
FIG. 2 is a cross-sectional view of FIG. 1 taken along the line II—II in direction of the arrows.

Referring now to the figures of the drawing, there is shown fragmentarily a reactor pressure vessel 1 of a boiling-water reactor, for example, for 3900 MW$_{th}$, in the form of a substantially cylindrical body having a vertical longitudinal axis. The reactor pressure vessel 1 has four identical feedwater inlet nozzles 2 only one of which is illustrated. The feedwater inlet nozzles 2 have a horizontal axis and an inner diameter $D_i$ of, for example, 500 mm. In each nozzle 2, a heat protective pipe 3 with a diameter of 350 mm is mounted. As a result thereof, an annular gap 4 is formed, which affords inspection of the feedwater inlet nozzle 2 from the interior 5 of the reactor pressure vessel 1.

The heat protective pipe 3 is provided, in the interior 5 of the reactor pressure vessel 1, with extensions or projections 6 which extend away upwardly at an angle and form part of connecting means or a connection device which is identified as a whole by the reference numeral 7. In the connection device 7, the feedwater distribution or sparger ring 10 is connected to a locking device 11.

Figure 3:
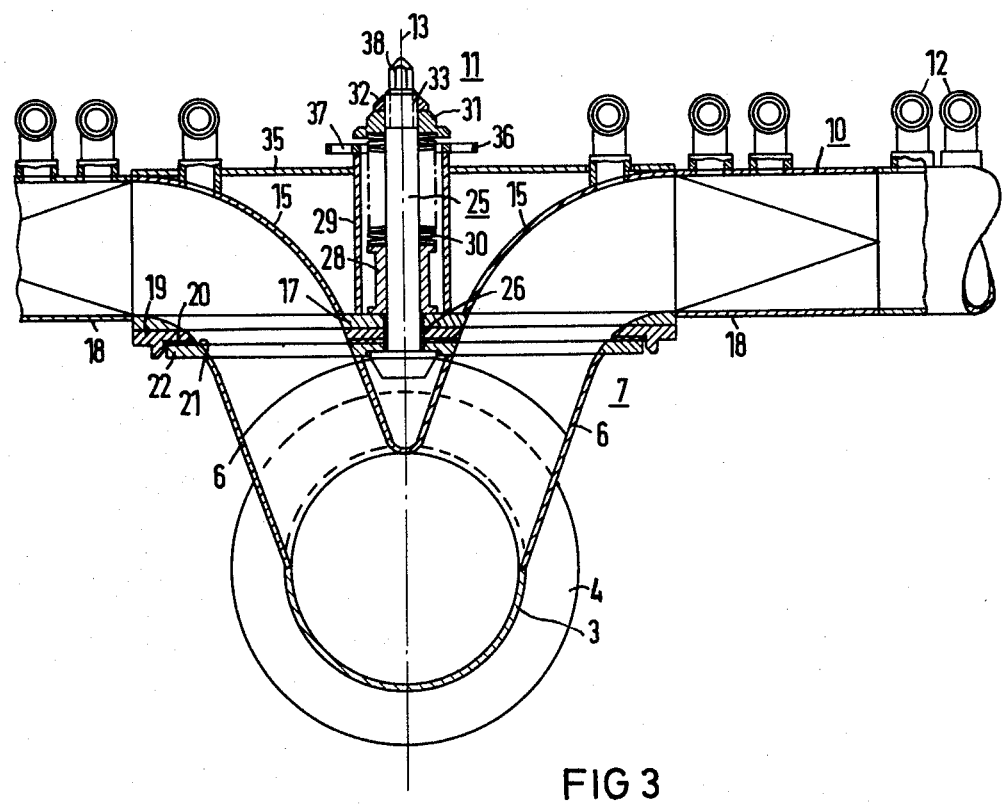
FIG. 3 is a longitudinal sectional view of the feedwater distribution or sparger ring as connected to the heat protective pipe in FIG. 1 taken along the line III—III in direction of the arrows.

The feedwater distribution or sparger ring 10 is a ring formed of a pipe having a diameter, for example, of 220 mm and extending in a horizontal plane around the circumference of the reactor pressure vessel 1 in the interior 5 thereof. As shown in FIG. 3, nozzles 12 extend from the upper side of the sparger ring 10, feedwater flowing through the heat protective pipe 3 into the sparger ring 10 at a location of the circumference of the reactor pressure vessel 1, being uniformly distributed over the circumference of the vessel 1 through the nozzles 12.

The connection device 7 located between the extension 6 of the heat protective pipe 3 and the feedwater distribution or sparger ring 10 is constructed symmetrically to a plane extending perpendicularly to the plane of the drawing of FIG. 3 and represented by a dash-dot line 13 through which the axis of the heat protective pipe 3 extends perpendicularly. The connection device 7 includes two elbows 15 which are disposed symmetrically to one another and extend downwardly at an angle from the plane of the ring 10 so as to align with and cover the cross section of the extensions 6. The elbows 15 terminate at a plate 17 which is welded to respective ends 18 of the feedwater distribution or sparger ring 10.

An intermediate plate 19 formed, like the other parts of the feedwater distribution or sparger ring 10, of austenitic steel, is bolted to the plate 17. A plate 19 has a horizontal contact surface 20 with which it rests upon a contact surface 21 of a plate 22 which is, in turn, welded to the extensions 6 of the heat protective pipe 3. The contact surfaces 20 and 21 are clad or armored with an especially hard austenitic material and are precisely or finely machined, such as by grinding, for example. The plate 19 serves, moreover, for equalizing tolerances and is adapted or fitted i.e. machined to a required extent or dimension, in the field or at the job site, before it is bolted to the plate 17.

In the region of the plane of symmetry 13, the plates 19 and 22 are pressed together by means of a hammerhead bolt 25, which projects through holes 26 formed in the plates 17, 19 and 22. Above the plate 17, as viewed in FIG. 3, the hammerhead bolt 25 is surrounded by a sleeve 28 which is disposed loosely in a pipe section 29 located between the elbows 15. On the upper side of the sleeve 28, cup springs or Belleville spring washers 30 are stacked. A cap or bonnet 31, which can be prestressed by a nut 32 on the thread 33 of the hammerhead bolt 25, presses against the cup springs 30.

The hammerhead bolt 25 therefore exerts a force transmitted by the cup springs 30 of, for example, 27,000 N (newtons), resulting in a defined friction lock or closure between the plates 19 and 22. Varying thermal stresses between the extensions 6, on the one hand, and the elbows 15, on the other hand, in the region of the connecting means or connection device 7 can therefore equalize if they should exceed a certain amount.

To improve the strength thereof, the pipe section 29 is set or held in a plate 35 which is welded to the ends 18 of the feedwater distribution or sparger ring 10. This provides great strength in the region of the connecting means or connection device 7, so that flow forces in the deflection or bend of the elbows 15 and projections 6 and the hereinaforementioned varying thermal expansions or elongations cannot cause deformation of the feedwater distribution or sparger ring 10.

Above the plate 35, a flange 36 is welded to the pipe section 29. To lock and release the hammerhead bolt 25, a tool may be brought into engagement therewith and may be inserted into bores 37 formed in the flange 36 in order to obtain an abutment or opposed bearing surface for pressing the hammerhead bolt 25 down against the springs 30. To effect a remotely controlled release or opening of the locking of the hammerhead bolt 25, the latter is turned by means of the hexagonal end 38 thereof which serves as a gripping surface for a suitable tool. A traverse pin provided in the stem of the hammerhead bolt 25 can also serve as a gripping or engagement surface for a loosening tool. Thus, it is possible to open or release the locking of the connecting means or connection device 7 in a relatively simple manner. The feedwater distribution or sparger ring 10 can then be lifted, for example, together with a non-illustrated steam separator, so that, as mentioned hereinbefore, the feedwater inlet connecting stubs 2 are available for tests.

There are claimed:

1. In a reactor pressure vessel for a boiling-water reactor having a feedwater inlet nozzle, the combination comprising a heat protective pipe received in the nozzle and having an extension projecting therefrom, a feedwater sparger ring disposed in a given plane inside the vessel and having additional nozzles disposed thereon for distributing feedwater inside the vessel, and means for connecting said feedwater sparger ring to said heat protective pipe, said connecting means comprising an elbow extending angularly downward from said given plane and connecting said feedwater sparger ring to said extension of said heat protective pipe, another extension projecting from said heat protective pipe, and said connecting means also comprising another elbow extending angularly from said given plane and extending said feedwater sparger ring to said other extension of said heat protective pipe defining two portions of said sparger ring being disposed between said connections, said portions both being open between said connections, said extensions and said elbows being, respectively, disposed symmetrically to one another with respect to a common plane of symmetry being perpendicular to the axis of said heat protective pipe and including a locking device disposed in said plane of symmetry and locking said extensions and said elbows together.

2. In a reactor pressure vessel for a boiling-water reactor having a feedwater inlet nozzle, the combination comprising a heat protective pipe received in the nozzle and having an extension projecting therefrom, a feedwater sparger ring disposed in a given plane, and means for connecting said feedwater sparger ring to said heat protective pipe, said connecting means comprising an elbow extending angularly from said given plane and connecting said feedwater sparger ring to said extension of said heat protective pipe, another extension projecting from said heat protective pipe, and said connecting means also comprising another elbow extending angularly from said given plane and connecting said feedwater sparger ring to said other extension of said heat protective pipe, said extensions and said elbows being, respectively, disposed symmetrically to one another with respect to a common plane of symmetry and including a locking device disposed in said plane of symmetry and locking said extensions and said elbows together, said given plane being substantially horizontal and said locking device comprising a bolt having a vertical axis and being disposed so as to be accessible from above said feedwater sparger ring.

3. The combination according to claim 2 wherein said bolt is a hammerhead bolt having a gripping surface thereon located above said feedwater sparger ring, said gripping surface being engageable by a tool for turning said bolt.

4. In a reactor pressure vessel for a boiling-water reactor having a feedwater inlet nozzle, the combination comprising a heat protective pipe received in the nozzle and having an extension projecting therefrom, a feedwater sparger ring disposed in a given plane, and means for connecting said feedwater sparger ring to said heat protective pipe, said connecting means comprising an elbow extending angularly from said given plane and connecting said feedwater sparger ring to said extension of said heat protective pipe, another extension projecting from said heat protective pipe, and said connecting means also comprising another elbow extending angularly from said given plane and connecting said feedwater sparger ring to said other extension of said heat protective pipe, said extensions and said elbows being, respectively, disposed symmetrically to one another with respect to a common plane of symmetry and including a locking device disposed in said plane of symmetry and locking said extensions and said elbows together, said locking device comprising spring means for yieldably transmitting a force.

5. The combination according to claim 2 or 4 including means defining a finely machined abutting surface between said extension and said elbow.

6. The combination according to claim 5 wherein said means defining said surface comprise a plate disposed between said extension and said elbow.

7. The combination according to claim 6 wherein said plate has an armor cladding and is finely machined on one side thereof.

8. The combination according to claim 7 wherein said feedwater sparger ring has a part disposed opposite and in engagement with said armor-clad and finely machined side of said plate, said part of said feedwater sparger ring being substantially similarly armor-clad and finely machined.

* * * * *